March 11, 1930.　　　A. R. ROGERS　　　1,750,431
FISH CUTTING MACHINE
Filed Jan. 28, 1929　　3 Sheets-Sheet 1
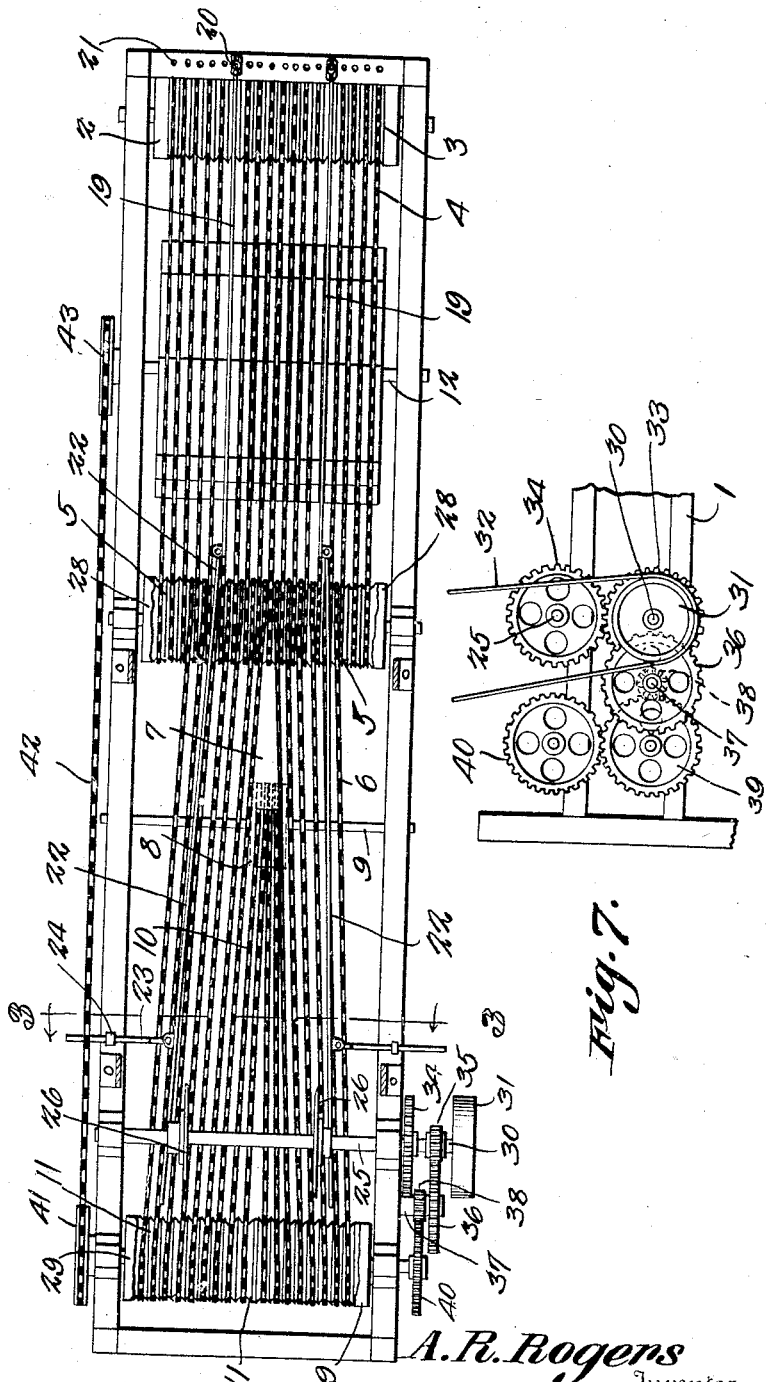

March 11, 1930.  A. R. ROGERS  1,750,431
FISH CUTTING MACHINE
Filed Jan. 28, 1929  3 Sheets-Sheet 2
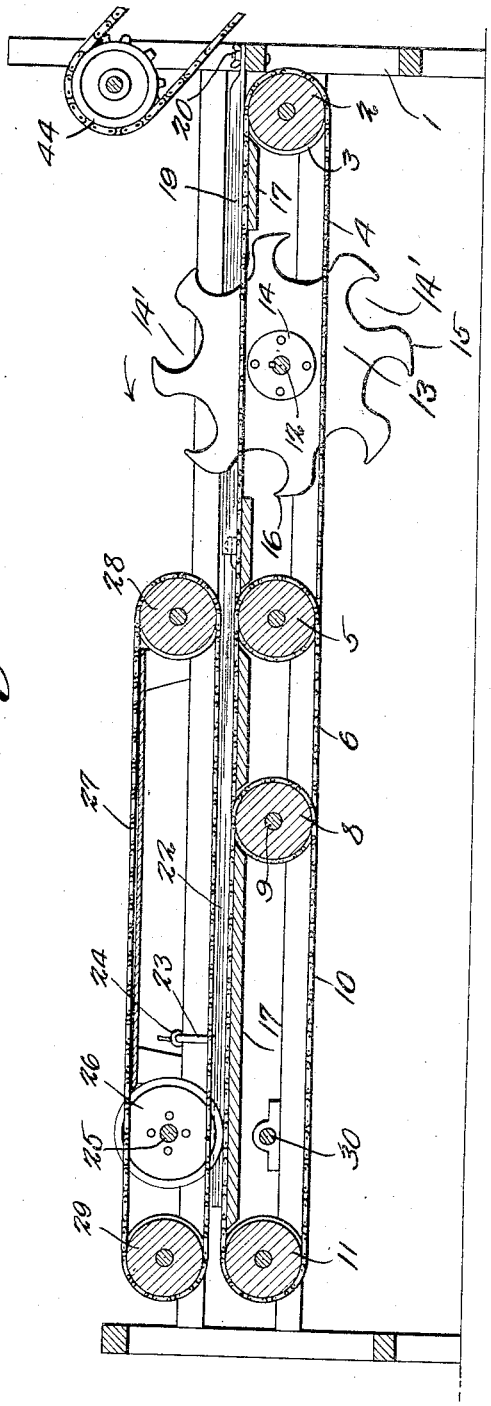
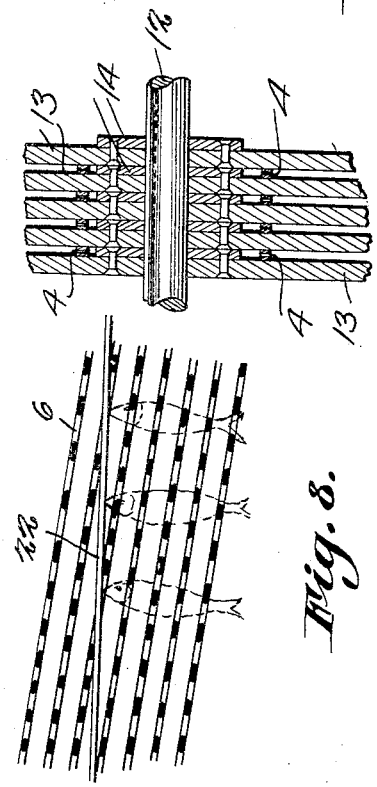
A. R. Rogers
Inventor
By C. A. Snow & Co.
Attorneys.

March 11, 1930. A. R. ROGERS 1,750,431
FISH CUTTING MACHINE
Filed Jan. 28, 1929   3 Sheets-Sheet 3

A. R. Rogers
Inventor
By C. A. Snow & Co.
Attorneys.

Patented Mar. 11, 1930

1,750,431

UNITED STATES PATENT OFFICE

ARTHUR R. ROGERS, OF JONESPORT, MAINE

FISH-CUTTING MACHINE

Application filed January 28, 1929. Serial No. 335,579.

This invention relates to a machine for cutting fish and is designed primarily for cutting sardines and other fish of small sizes. Heretofore the best means evolved for cutting fish mechanically have utilized water as a medium for causing the fish to become properly positioned in the apparatus prior to the cutting operation. The use of water is not always possible economically because of the large amount required and because of the necessity of utilizing pumps for elevating the water to points of use.

The present invention has for an object the provision of means for properly positioning the fish prior to being cut, said means operating without the use of a water current and being so constructed as to accurately place the fish as they travel therethrough.

A further object is to provide a machine which materially cheapens the operation of cutting fish, this being due to its greater capacity, the reduced cost of operating, and the reduced cost of construction.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the machine has been shown.

In said drawings,

Figure 1 is a top plan view of the machine, the upper or retaining chains being removed.

Figure 2 is a vertical longitudinal section through the machine.

Figure 4 is an enlarged transverse section through a portion of the rotary cradle.

Figure 3:
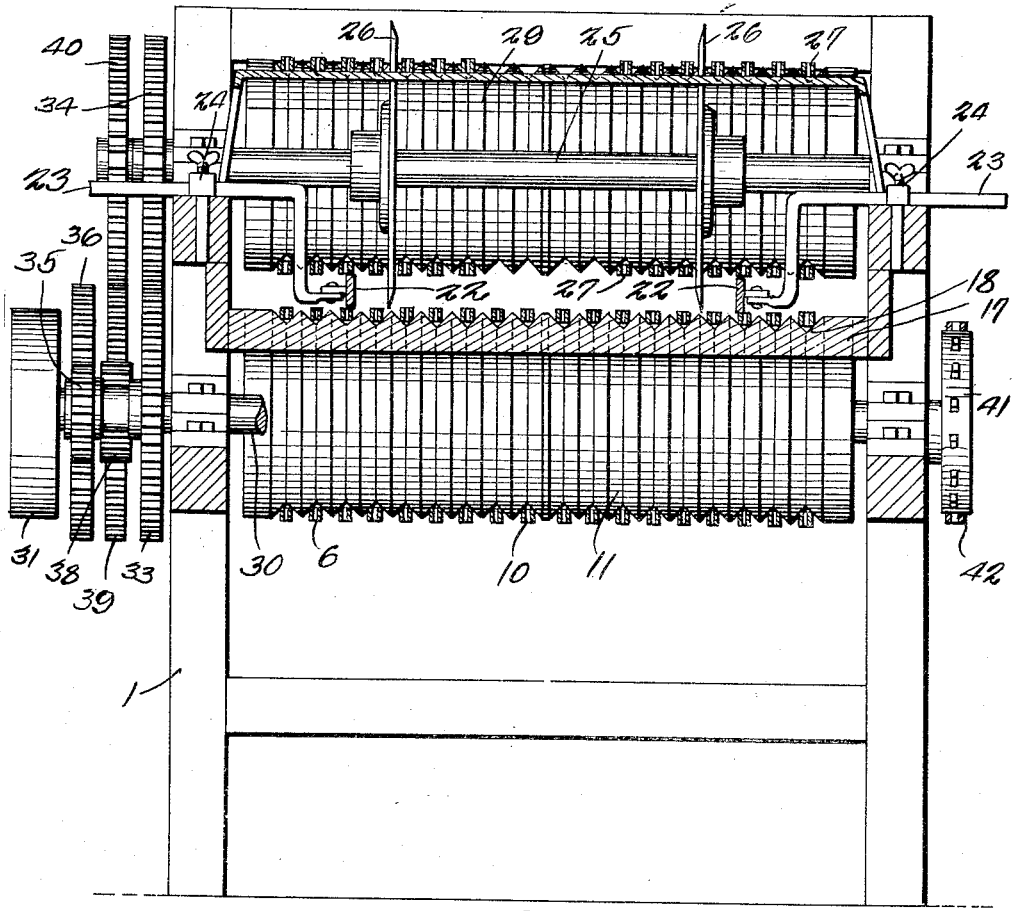
Figure 3 is an enlarged section on line 3—3, Figure 1.
Figures 5, 6:
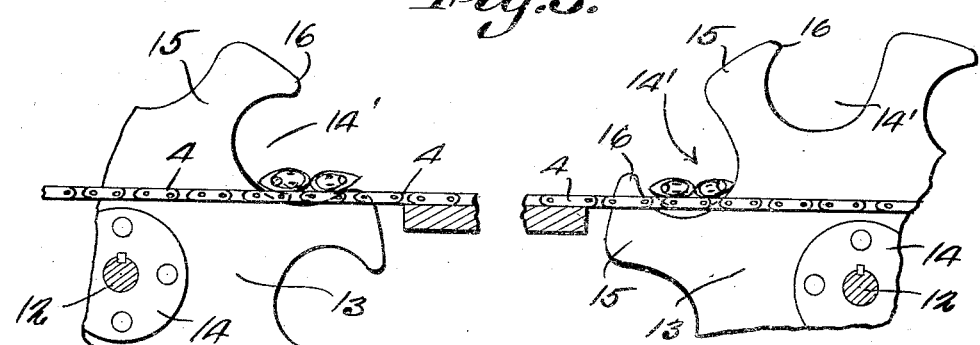

Figure 5 is a longitudinal section through a portion of the cradle showing the position of some fish when first engaged thereby.

Figure 6 is a section through a portion of the cradle showing some fish in position immediately prior to being released.

Figure 7 is a side elevation of the drive mechanism.

Figure 8 is a plan view of a portion of the apparatus showing a gage strip adjusted to position across the conveying elements.

Referring to the figures by characters of reference, 1 designates an elongated frame provided, adjacent one end, with a drum 2 in the periphery of which are formed a number of annular grooves 3. Endless conveyors 4, which can be in the form of chains or other suitable devices, are seated in the respective grooves and extended longitudinally within the frame to another drum 5 likewise provided with a number of peripheral grooves in which the endless conveyors are seated. Additional annular grooves are formed in this drum 5 and have endless conveying elements 6 seated therein, each of these conveying elements being in the form of a chain or the like. The conveying elements 6 are arranged in separate groups that diverge toward that end of the frame 1 remote from the drum 2. The endless conveyors in each group are parallel and the space 7 formed between the two groups contains a drum 8 mounted on a transverse shaft 9. On this drum 8, which is formed with peripheral grooves extending therearound, are endless conveying elements 10 in the form of chains or the like, these elements likewise diverging so as to be parallel with the conveying elements 6. All of the conveying elements 6 and 10 are supported in one end of the machine by a drum 11 having annular peripheral grooves in which the several conveying elements are seated.

Extending transversely of the frame between drums 2 and 5 is a shaft 12 to which are secured parallel disks 13 spaced apart by washers 14 held to the respective disks 13 by rivets or the like. Each disk 13 has peripheral recesses 14' forming lifting arms 15 between them, each lifting arm having its advancing edge defining an ogee curve while the opposed or following edge of each arm is concaved longitudinally, terminating at its outer end in a restraining finger 16 extending oppositely to the direction of rotation of the disks. All of the disks rotate together with the shaft and cooperate to constitute a rotatable cradle, these disks being spaced apart such distances as to work between the several conveying elements 4 which will travel freely between the disks without interfering with the rotation of said disks.

The supporting table 17 is mounted in the frame 1 and extended under the upper flights of the conveying elements 4, 6 and 10, there being grooves 18 in the upper surface of the table for receiving the upper flights of the conveying elements so as properly to guide them. The table is cut away at proper points to receive the upper portions of the drums 2, 5, 8, and 11 and to receive the disks constituting the cradle.

Mounted in that portion of the frame 1 adjacent to the cradle are guide strips 19 fastened at one end by bolts 20 extending into selected apertures of a series indicated at 21 formed in one end of the frame. These strips are positioned between predetermined disks 13 and are supported parallel with the adjacent conveying elements 4. Strips 19 extend close to the drum 5 where they are secured by any suitable means. To each of these strips 19 is pivotally connected a gage strip 22 which extends along the adjacent conveying element 6 and is held adjustably by a laterally extending arm 23 pivotally attached to the strip and clamped to one side of the frame as shown at 24. These gage strips 22 extend close to the drum 11.

A transverse shaft 25 is journaled in the frame and extends over the gage strips 22. To this shaft are attached cutting disks 26.

For the purpose of holding fish to the conveying elements 6 and 10, upper retaining elements in the form of endless chains or the like indicated at 27 can be arranged above the conveying elements 6, these being mounted on drums 28 and 29 located above the drums 5 and 11 respectively.

Any suitable means may be employed for actuating the mechanism of this machine. For example a shaft 30 can be extended laterally from the frame 1, the same being provided with a pulley 31 for receiving motion through a belt 32 from any suitable source. A large gear 33 rotates with the shaft 30 and meshes with a similar gear 34 secured to the shaft 25 of the cutters. Another smaller gear 35 rotates with shaft 30 and meshes with a larger gear 36 secured to a short countershaft 37 having a small gear 38. This latter gear meshes with a larger gear 39 secured to the shaft of drum 11. Gear 39 meshes with another similar gear 40 secured to the shaft of drum 29. A sprocket 41 can rotate with the drum 11 and is used for transmitting motion through a chain 42 to a sprocket 43 on the shaft 12 of the cradle. As indicated in Figure 2 a suitable elevator 44 can be employed for conveying fish to the machine and depositing them on the receiving end of table 17 and the adjacent portions of the conveying elements 4.

In practice the guide strips 19 and the gage strips 22 are adjusted to properly handle fish of the size to be cut, it being understood that the cutting disks 26 will be located at such distances from the gage strips 22 as to sever the heads of the fish when thrust against the gage strips and while said fish are extended transversely of the machine. The fish are delivered in any desired quantities by the elevator or any other means provided for that purpose and are deposited on the receiving end of the table 17 where they are engaged by the advancing upper flights of the conveying elements 4. Thus the fish will be carried into the recesses 14' in the path thereof and as the cradle slowly rotates in the direction indicated by the arrow in Figure 2, those fish in the recess in the cradle will be carried upwardly and forwardly while the arm 15, as it ascends, will push back any fish that have failed to properly enter the recess. Thus each time a recess comes into the path of the fish it will be partly filled and the said fish carried forwardly and upwardly. During this movement of the fish with the cradle they will be straightened out by gravity and subsequently deposited on the conveying elements 4 at the delivery side of the cradle. At this point the fish will be momentarily retarded by the fingers 16 thereby giving the conveying elements 4 an opportunity to draw the fish forward tightly against the fingers so as to straighten them out transversely before the fingers are retracted downwardly between the elements 4. As soon as the fish are entirely released by the downward withdrawal of the fingers 16, they will move forwardly over the drum 5 and on to the diverging conveying elements 6. As the head portion of each fish is heavier than the tail portion, the fish will move to that side toward which the head is pointed. Thus the heads of the fish will come close to or against the gage strips 22 and as the fish move forwardly within the machine the same will be severed at the proper points by the adjacent cutting disks 26. The retaining element 27 will hold the fish firmly on the elements 6 and 10 so that they will not become displaced while travelling toward and past the cutting disks.

Obviously, by using apparatus such as described, it becomes unnecessary to employ water for the purpose of properly placing the fish in the machine. Furthermore the capacity of the machine is greatly increased and the fish are severed with greater accuracy than has heretofore been possible.

As the gage strips 22 are supported between the planes in which the conveying elements 6 and the retaining elements 27 work, they can obviously be adjusted angularly about their points of connection with the guide strips 19. Where these gage strips 22 are adjusted angularly toward each other so as to cross the conveying elements thereunder, said elements will obviously tend to carry the fish laterally until they come against the gage strips where they will be held as the fish are carried forwardly against the cutting disks. Such a position of one of the gage strips relative to the conveying elements thereunder has been indicated in Figure 8.

What is claimed is:

1. In a machine for cutting fish the combination with cutters, and a series of endless conveying elements, of a rotatable cradle working between said elements for successively picking up a plurality of fish from the conveying elements, positioning them by gravity in the cradle, and depositing them on the conveying elements.

2. In a machine for cutting fish the combination with cutters, and conveying elements for carrying fish toward the cutters, of means working between the conveying elements for picking up fish therefrom, arranging them by gravity, and depositing them on said elements.

3. In a machine for cutting fish the combination with a cutter, of conveying means for carrying fish toward the cutter, and rotatable means for successively picking up fish from said means, positioning them by gravity, and depositing the fish on the conveying means for movement toward the cutter.

4. In a machine for cutting fish the combination with endless conveying elements, means for depositing fish thereon, and a cutter, of a rotatable cradle working between the conveying elements and constituting means for successively picking up fish from said elements, positioning them by gravity in a predetermined relation to the machine, and depositing the fish on the conveying elements in advance of the cutter.

5. In a machine for cutting fish the combination with endless conveying elements for supporting fish to be cut, of a cradle including spaced disks, arms extending from the peripheries of the disks providing fish receiving recesses therebetween, and means for rotating the disks to pick up the fish above the conveying elements, arrange them by gravity in predetermined positions relative to the planes of movement of the disks, and depositing the fish, when properly arranged, upon the conveying elements.

6. In a machine for cutting fish the combination with fish conveying elements and mechanical means for automatically arranging the fish transversely of said elements, of diverging fish conveying elements for receiving the fish after their arrangement, gages above the diverging elements constituting abutments for fish, and cutters in the paths of the fish and between the gages.

7. In a machine for cutting fish the combination with diverging conveying elements, of means for depositing fish on said elements in positions extending transversely of their direction of movement, gage strips adjustable laterally and supported above the conveying elements, and cutters in the paths of the fish and between the gage strips.

8. In a machine for cutting fish the combination with endless conveying elements, of a cradle rotatably mounted between said elements, means for rotating the cradle continuously to pick up fish from said elements, position them by gravity transversely of the planes of movement of the cradle, and deposit them on the conveying elements, and means carried by the cradle for momentarily retarding the release of the fish therefrom after they have been deposited on the conveying elements.

9. In a fish cutting machine the combination with fish conveying means including diverging portions and mechanical means for automatically positioning fish transversely of the conveying means, of gage strips adjustably supported above the diverging portions, endless retaining elements above said diverging portions for holding fish upon the diverging portions, and cutting elements extending between the gage strips and into the paths of the fish.

10. In a machine for cutting fish the combination with fish conveying means having an obliquely disposed portion, of a gage strip adjustably mounted angularly above said obliquely disposed portion thereby to constitute an abutment for fish shifted laterally by the obliquely disposed portion conveying them, a cutter in the path of the fish and in a predetermined position relative to the gage strip, and means for mechanically and automatically positioning fish on the conveying means and transversely of their path of movement.

In testimony that I claim the foregoing as my own, I have hereto affixed my signature.

ARTHUR R. ROGERS.